A. R. BROCKSMITH.
RADIUS ROD CONSTRUCTION.
APPLICATION FILED DEC. 19, 1919.

1,383,521. Patented July 5, 1921.

Attest.
Charles A. Becker.

Inventor.
Adolph R. Brocksmith,
by Rippey & Kingsland,
His Attorneys.

UNITED STATES PATENT OFFICE.

ADOLPH R. BROCKSMITH, OF ST. LOUIS, MISSOURI.

RADIUS-ROD CONSTRUCTION.

1,383,521.  Specification of Letters Patent.  Patented July 5, 1921.

Application filed December 19, 1919. Serial No. 346,105.

*To all whom it may concern:*

Be it known that I, ADOLPH R. BROCKSMITH, a citizen of the United States, residing at the city of St. Louis and State of Missouri, have invented a new and useful Radius-Rod Construction, of which the following is a specification.

This invention relates to radius rod construction for motor vehicles.

An object of the invention is to provide an improved radius rod construction comprising a member having swivel connection with a fixed part of the motor vehicle, and its ends secured to the front axle at or near the lower side edge thereof, in combination with a member attached to the first-named member near the crotch and having its ends of angular construction to bear against one of the vertical sides and also against one of the horizontal sides of the first-named member, and having its ends attached above the front axle.

Another object is to provide an improved radius rod construction comprising a bifurcated member having swivel connection with a fixed part of the motor vehicle and having its arms extending under the spindle connecting rod and also under the steering gear connecting rod and secured to the lower portion of the front axle, in combination with a coöperating member of angular material interlocked with the bifurcated member near the crotch thereof and having its angles contacting with the inner and upper sides of the arms of the first-named member, and having its arms extending above the spindle connecting rod and the steering gear connecting rod and rigidly attached above the front axle; whereby a structure is provided comprising a lower member and an upper member between which the spindle connecting rod and the steering gear connecting rod extend, and whereby both members of the radius rod structure are prevented from interfering with the free movement and operation of said connecting rods, and the front axle and its connected parts are rigidly held in proper adjustment.

In the drawing Figure 1 is a plan view illustrating my new invention.

Figure 1:
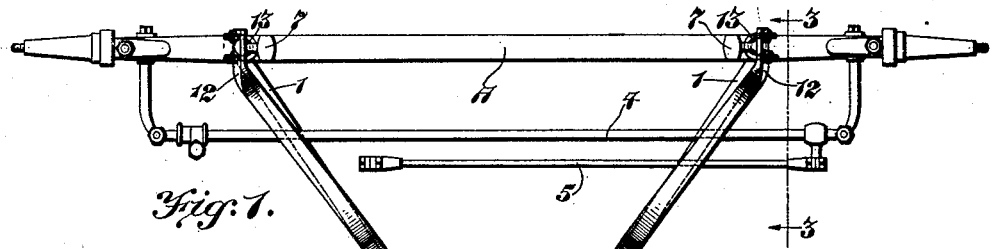
Figure 2:
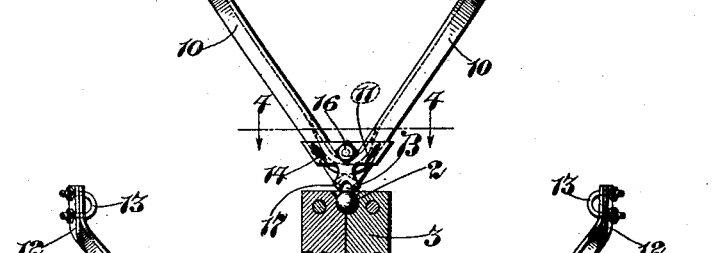
Fig. 2 is an inverted view of the upper member of the radius rod construction.
Figure 3:
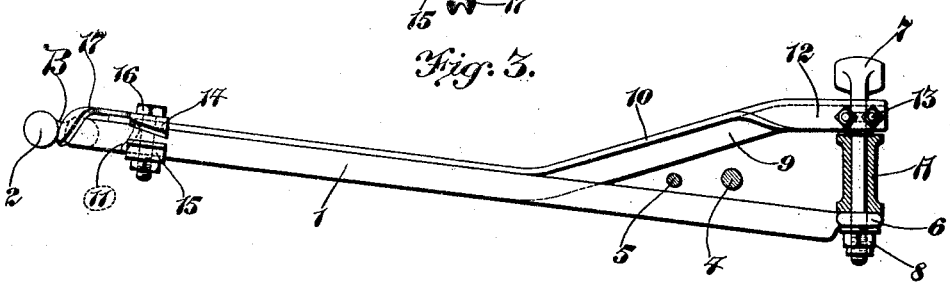
Fig. 3 is an enlarged side elevation of the invention, the front axle being shown in section.

As shown my invention comprises a bifurcated member 1 having swivel connection 2 with a fixed part 3 of the motor vehicle. The swivel connection is at the union of the two arms of the member 1. The two arms of the member 1 diverge forwardly and extend below the spindle connecting rod 4 and below the steering gear connecting rod 5 of the vehicle. The forward ends of the arms of the member 1 are provided with eyes 6 through which the shanks of the spring perches 7 extend. The shanks of the spring perches extend through holes through the front axle A and through the eyes 6 of the member 1 and have nuts 8 threaded on their lower ends and rigidly holding the spring perches in proper adjustment and the ends of the arms of the member 1 rigid.

The coöperating member of the radius rod structure is preferably composed of angle iron and, if desired, may be made of a single piece of angle iron as shown. When the coöperating member is composed of a single piece of angle iron, said piece is bent to form two diverging arms of equal length, each having a vertical flange 9 and a horizontal flange 10. At or near the crotch of the angle iron member the vertical flange 9 is bent to form an interlocking portion 11. The angle iron member is placed upon the member 1 with the horizontal flange 10 thereof bearing upon the upper surface of the arms of the member 1 for some distance between the crotch of the member 1 and the ends of the arms thereof.

The vertical flange 9 bears against the inner sides of the arms of the member 1 for some distance between the crotch of said member and the ends of the arms thereof. When so positioned the bent portions 11 engage under the inner portions of the arms of the member 1, as will be understood by reference to Fig. 4, in which it will be seen that an interlocking connection exists between the upper and lower members and that it is impossible for the upper member to be raised from the lower member without bending the parts 11 out of their interlocking engagement with the arms 1. As stated, the vertical and horizontal flanges of the angle iron member bear against or engage the inner and upper surfaces, respectively, of the arms of the member 1 for some distance between the crotch of the member 1 and the ends of the arms thereof. At a desired point the arms of the angle iron member diverge upwardly from the arms of the member 1, passing above the spindle connecting rod 4 and the steering gear connecting rod 5, leaving said rods free to operate between and out of contact with the lower and upper members. For a short distance from the ends of the arms of the angle iron member the horizontal flange 10 of each arm is folded against the outer surface of the vertical flange, thus providing a doubled portion 12 at the extremity of each arm of the upper member. The ends of the arms of the upper member are above the front axle A and adjacent to the spring perches 7 to which said ends are secured by U-shaped fastening devices 13 passing through holes in the ends 12 of the upper member and embracing the spring perches 7 between the arms thereof.

Figure 4:
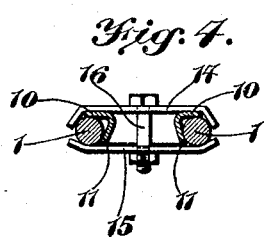
Fig. 4 is a cross sectional view on the line 4—4 of Fig. 1, illustrating the interlocking connection between the two members of the radius rod device.
Figure 5:
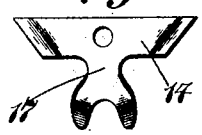
Fig. 5 is a top plan view of the upper clamping member.

If desired a coöperating securing device or clamp may be used in addition to the interlocking portions 11 in order to hold the crotches of the upper and lower members in rigid connection. One form of such securing device or clamp is shown. As shown, said device or clamp comprises an upper member 14 seated upon the horizontal flange of the angle iron member and having its ends bent downwardly at the sides of said members, as shown in Fig. 4; and a lower member 15 extending under the two parts of the radius rod structure and having its ends bent outwardly at the sides of the arms of the member 1. A bolt 16 passes through said members and with the nut thereof binds or clamps said members 14 and 15 together, thus rigidly holding the parts in proper relation.

The upper member 14 of the securing device or clamp is preferably provided with a bifurcated extension 17. The arms of the bifurcated extension embrace the neck B of the lower member 1 between them. The arms of the extension 17 are curved or extended downwardly to effect proper engagement with the neck B and in order to bear against the shoulder formed at the union of the diverging arms of the member 1. Thus, the securing or clamp device will be rigidly held in proper position, insuring that all parts of the radius rod structure will retain their proper adjustment.

It is an important feature of my invention that the connecting rods 4 and 5 extend above the arms of the member 1 which has swivel connection with a fixed part of the vehicle and that said connecting rods extend below the arms of the coöperating angle iron radius rod member. The construction shown and described is very strong, preventing warping or bending of any of the parts under strains, for without the angle iron upper radius rod member the parts would bend or otherwise become disarranged so that the connecting rods 4 and 5 would engage and rub against the arms of the lower member 1. That would interfere with the proper operation and control of the vehicle since lateral movement of the rods 4 and 5 is necessary in steering the vehicle. In addition to these broader features of the invention the interlocking connection 11 between the upper and lower members is highly advantageous, because it will hold the upper and lower parts of the radius rod structure rigidly together even though the clamp members 14 and 15 work loose or become detached, or omitted entirely. While I have shown the angle iron member composed of a single piece, I do not restrict myself in that particular because said member may obviously be otherwise constructed.

I claim:

1. In a motor vehicle, a radius rod construction comprising a bifurcated member having a swivel connection with a part of the motor vehicle, and having its arms connected to the lower side of the front axle, an upper member composed of angle iron and having two diverging arms having their ends rigidly secured above the front axle and having interlocked connection with the crotch of the lower member, the angles of said upper member engaging both the inner and the upper sides of the arms of the lower member for relatively a considerable distance between the crotch of the lower member and the front axle.

2. A radius rod construction, comprising a lower member having diverging arms secured at their ends to the under side of the front axle of the vehicle, an upper member composed of angle iron and having two diverging arms, the angles of the angle iron bearing against the upper and the inner sides of the arms of the lower member and interlocking with the lower member adjacent to the crotch thereof, and elements rigidly connecting the ends of the upper member with the front axle.

3. In a motor vehicle, the combination with the front axle, the spindle connecting rod extending transversely of the vehicle parallel with the front axle, and the steering gear connecting rod extending transversely of the vehicle, of a radius rod member comprising two diverging arms having a swivel connection with a fixed part of the motor vehicle and having its arms extending under said connecting rods and rigidly secured to the under side of the axle, an upper radius rod member composed of angle iron having interlocking connection with the upper and lower sides of the lower member near the crotch thereof and bearing against the upper and inner sides of the arms of the lower member for relatively a considerable distance between the crotch of the lower member and the front axle, and the arms of said upper member extending above said connecting rods and above the front axle, and elements holding said arms rigidly in connection with the front axle.

4. In a motor vehicle, a radius rod construction comprising a bifurcated member having its arms connected to the front axle; a neck extending from the union of said arms and having swivel connection with a part of the motor vehicle; an additional member which is composed of angle iron and which has two diverging arms having their ends rigidly secured to the front axle; a clamp device composed of two parts located respectively above and below said members and having their ends engaging the outer sides of the arms of said bifurcated member; and an extension from one of said parts engaging the neck of said bifurcated member between said swivel connection and the union of said arms.

5. In a motor vehicle, the combination with a front axle and a bifurcated member having a swivel connection with a part of the motor vehicle and having its arms connected to the front axle, of an additional member which is composed of angle iron and which has two diverging arms having their ends rigidly secured above the front axle, said additional member bearing against the upper and the inner sides of the arms of the first-named member for a portion of the length thereof between the crotch of the first-named member and the front axle, a clamp device holding said members in engagement with each other, and an extension on said clamp device engaging the shoulders formed by the diverging arms of the bifurcated member.

ADOLPH R. BROCKSMITH.